United States Patent [19]

Clay

[11] Patent Number: 4,930,561
[45] Date of Patent: Jun. 5, 1990

[54] ROLL-UP DOOR JOINT CONSTRUCTION

[75] Inventor: Roy T. Clay, Snyder, N.Y.

[73] Assignee: Whiting Roll-up Door Mfg. Corp., Akron, N.Y.

[21] Appl. No.: 316,489

[22] Filed: Feb. 28, 1989

[51] Int. Cl.⁵ .............................................. E06B 3/12
[52] U.S. Cl. ................................ 160/229.1; 160/201; 160/40
[58] Field of Search ............... 160/133, 201, 202, 235, 160/236, 229.1, 232, 40

[56] References Cited

U.S. PATENT DOCUMENTS

| | | | |
|---|---|---|---|
| 2,134,397 | 10/1938 | Clark | 160/229.1 |
| 2,354,485 | 7/1944 | Slaughter | 160/235 |
| 3,034,575 | 5/1962 | Stroup | 160/40 |
| 3,148,724 | 9/1964 | Chieger et al. | 160/201 X |
| 3,347,305 | 10/1967 | Urbanick | 160/229.1 X |
| 4,068,699 | 1/1978 | Tucker | 160/202 X |
| 4,320,793 | 3/1982 | Lindbergh | 160/201 |
| 4,368,772 | 1/1983 | Bouthillier | 160/232 |
| 4,379,480 | 4/1983 | Kempel et al. | 160/201 X |
| 4,567,931 | 2/1986 | Wentzel | 160/236 X |
| 4,771,816 | 9/1988 | Clay Jr. | 160/235 |
| 4,854,365 | 8/1989 | Juneau | 160/232 |

FOREIGN PATENT DOCUMENTS 2001209 7/1971 Fed. Rep. of Germany ...... 160/236

Primary Examiner—David M. Purol
Attorney, Agent, or Firm—Sommer, Oliverio & Sommer

[57] ABSTRACT

An improved joint construction (10) for a roll-up door includes specially-configured upper and lower panel sections (12, 11), a specially-configured hinge member (13) adapted to be longitudinally inserted into operative engagement wiht lower panel section, and a seal member (14) protectively concealed within a recess (73) in the upper panel section. The hinge member is coated with a low friction material to facilitate its longitudinal insertion into operative engagement with the lower panel section, and to facilitate relative movement of the adjacent panel sections. The lower panel section has an upwardly-extending lug (42) which is arranged to enter the recess in the upper panel section and compress the seal member when the adjacent panels are in vertically-aligned relation to one another.

19 Claims, 2 Drawing Sheets

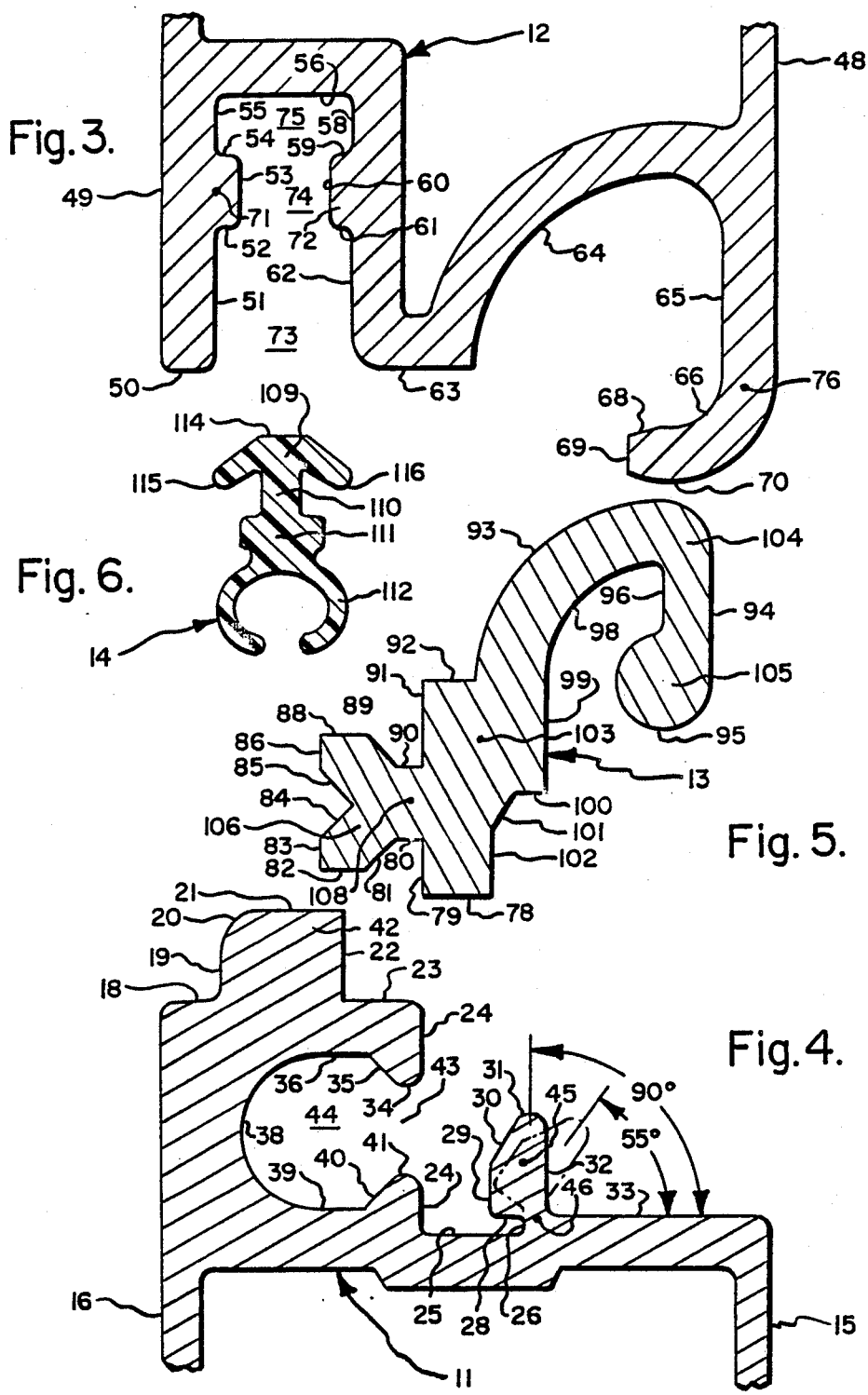

ROLL-UP DOOR JOINT CONSTRUCTION

TECHNICAL FIELD

This invention relates generally to the field of roll-up doors and the like, and, more particularly, to an improved hinge-and-seal joint construction for operatively connecting adjacent door panels.

BACKGROUND ART

Roll-up doors are commonly used in cargo vans, trailers, truck bodies, and the like, as well as in garage and industrial doors. These types of doors are generally movable along an inverted L-shaped track between a substantially vertical closed position and an overhead out-of-the-way substantially horizontal position.

In some applications, such as garage doors, the building or supporting structure upon which the door is mounted, is generally regarded as being stationary and immovable. On the other hand, when such doors are mounted on vehicular bodies, they are subjected to far more vibration than those of the stationary type. This added vibration, in addition to exposure to weather, load shifting within the cargo body, abusive operation, and the like, quickly contributes to a high degree of wear.

Heretofore, it has been known to provide the several panel sections, of which the door is typically constructed, of a plywood or metal-skinned material. Usually, the appurtenant hardware, such as rollers, hinges and the like, was simply attached to the door panel by any convenient means. In some cases, this appurtenant structure was simply bolted to the door panel. In cases where the door was subjected to a high degree of vibration and/or swelling due to absorption of moisture, it was preferred to rivet the hardware to the door section. However, the more securely such appurtenant structure was physically held to the door panel, the harder it was to remove in the event that repair or replacement is necessary. Moreover, conventional fasteners (e.g., bolt heads and nuts) provide relatively sharp edges which may damage goods within the truck or van body.

Because of the foregoing problems, it has been proposed to manufacture door panels of an extrudable material, such as plastic or aluminum. Typically, these panels would be extruded along their longitudinal axes. It is also known to provide a continuous-type hinge between adjacent panel sections, such as shown and described in U.S. patent application Ser. No. 06/859,025, filed May 2, 1986, now U.S. Pat. No. 4,771,816, and assigned to the assignee of the present application. That patent discloses that two adjacent panels may be extruded to have cooperative configurations arranged to receive an integral hinge-and-sealing member. That patent also contemplates that such member be of dual-durometer hardness. Basically, the hinge portion is formed of a relatively-rigid plastic material, while the integrally-formed sealing member is caused to have a greater degree of flexibility. In any event, while the hinge disclosed in said patent does provide an operative joint between adjacent panel sections, it is felt that such construction may be further improved.

DISCLOSURE OF THE INVENTION

The present invention provides a plurality of improvements for use in an upwardly-acting or roll-up door structure.

In one aspect, the invention provides an improved panel section for use in such a door. In this aspect, the improvement broadly includes: one longitudinal marginal end portion of such panel section having a generally-stepped configuration including a first surface extending away from one of the inner and outer faces of the door, having an intermediate second surface extending away from the first surface, and having a third surface extending away from the second surface to join other of the inner and outer surfaces; a recess extending into the panel section from the second surface, this recess including a narrowed entrance portion adjacent the second surface and leading into an enlarged cavity portion; and a post member extending away from the third surface in spaced relation to the second surface. If desired, the post member may be initially inclined with respect to the third surface at one angle, and thereafter bent through compliant plastic deformation of the web portion to be inclined at another angle with respect to the third surface. A lug may extend beyond the first surface, and this lug is adapted to be received within a cooperative recess provided in an adjacent panel such that a seal member retained within said recess will be compressively deformed when the two panels are in an aligned relation (i.e., either vertically or horizontally) with respect to one another.

In another aspect, the invention provides an improvement in an upwardly-acting door structure having a first panel pivotally connected to an adjacent second panel. In this aspect, one of the panels has a recess extending thereinto from a longitudinal end surface thereof, the other of the panels has a lug extending outwardly beyond a longitudinal end surface thereof, this lug being adapted to be received in the recess when the panels are arranged in vertically-aligned relation to one another, and a seal member is operatively arranged within this recess. This seal member has a C-shaped marginal end portion arranged to face the other of the panels, and is arranged to be compressed when the panels are in such vertically-aligned relation.

Accordingly, the general object of this invention is to provide an improved joint or hinge construction for an upwardly-acting roll-up door.

Another object is to provide an improved seal for use in such a door.

Another object is to provide an improved hinge-and-seal construction for use with extruded roll-up door panels.

These and other objects and advantages will become apparent from the foregoing and ongoing written specification, the drawings, and the appended claims.

BRIEF DESCRIPTION OF THE DRAWINGS

FIG. 3 is a fragmentary enlarged transverse vertical sectional view of the lower marginal end portion of the upper panel section.

FIG. 4 is a fragmentary enlarged transverse vertical sectional view of the upper marginal end portion of the lower panel section.

FIG. 5 is an enlarged transverse vertical sectional view of the hinge member.

FIG. 6 is an enlarged transverse vertical sectional view of the seal member.

MODE(S) OF CARRYING OUT THE INVENTION

Figure 2:
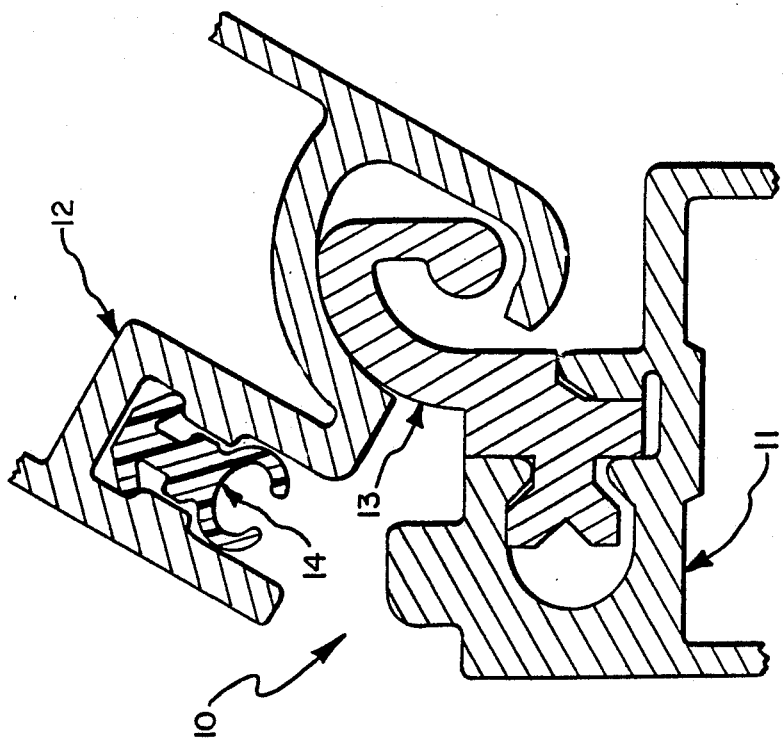
FIG. 2 is a view similar to FIG. 1, but shows the upper panel section as having been rotated in a clockwise direction through an angle of approximately 30° from the position shown in FIG. 1.

At the outset, it should be clearly understood that like reference numerals are intended to identify the same parts, portions or surfaces consistently throughout the several drawing figures, as such parts, portions or surfaces may be further described or explained by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention. As used in the following description, the terms "horizontal", "vertical", "left", "right", "up", and "down", as well as adjectival and adverbial derivatives thereof (e.g., "horizontally", "rightwardly", "upwardly", etc.) simply refer to the orientation of the illustrated structure as the particular drawing figure faces the reader. Similarly, the terms "inwardly" and "outwardly" simply refer to the orientation of a surface relative to its axis of elongation, or axis of rotation, as appropriate.

Referring now to the drawings, this invention provides an improved joint construction, of which the presently-preferred embodiment is generally indicated at 10, for use in pivotally connecting the adjacent panels or sections of an upwardly-acting door or closure. Such doors are commonly found on movable and vehicular bodies, such as trucks, trailers and the like, as well as in stationary structures, such as garage and industrial doors. As used herein, the term "upwardly-acting door" is intended to refer generically to this entire class of roll-up doors, wholly apart from the structure on which they are mounted.

Figure 1:
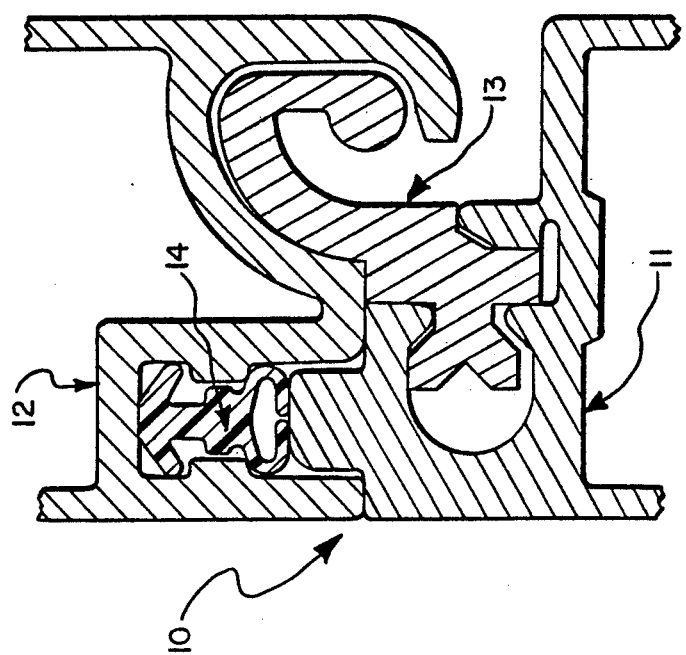
FIG. 1 is a fragmentary transverse vertical sectional view of the improved joint construction, this view showing the hinge member as being secured to the lower panel section with its hook portion received in the cooperative recess of the upper panel section, and also showing the lower panel lug member as being received in the upper panel recess and compressing the seal member.

As best shown in FIGS. 1 and 2, the improved joint construction broadly includes a first or lower panel section 11, a second or upper panel section 12, a hinge member 13, and seal member 14. In the accompanying drawings, the various parts and components are seen in transverse cross-section, and persons skilled in this art will readily appreciate that such parts are severally elongated along respective axes coming out of the plane of the paper.

Referring now to FIG. 4, the lower panel section is depicted as being an elongated hollow extruded member having a specially-configured upper marginal end portion arranged between its inner and outer planar vertical surfaces 15,16, respectively. More particularly, the upper marginal end portion of this panel section is shown as being sequentially bounded by, in pertinent part (from left-to-right): an upwardly-facing horizontal first surface 18 extending rightwardly from the upper margin of outer surface 16, a leftwardly-facing planar vertical surface 19, a rounded or convex transitional curved surface 20, an upwardly-facing horizontal surface 21, a rightwardly-facing vertical surface 22, an upwardly-facing horizontal surface 23, a rightwardly-facing vertical surface 24, an upwardly-facing horizontal surface 25, a leftwardly-facing vertical surface 26, a downwardly-facing horizontal surface 28, a leftwardly-facing vertical surface 29, a leftwardly- and upwardly-facing inclined planar surface 30, a rounded or convex upper surface 31, a rightwardly-facing vertical surface 32, and an upwardly-facing horizontal third surface 33 continuing rightwardly therefrom to join the upper margin of inner vertical surface 15. The intersections of surfaces 18,19 23,24 24,25, 25,26, 26,28, 28,29 and 32,33 are shown as being rounded or filleted, as appropriate. Surfaces 20 and 31 tangentially join adjacent surfaces 19,21 and 30,32, respectively.

A generally C-shaped longitudinal recess is shown as extending leftwardly into the upper marginal end portion of the lower panel section from its vertical second surface 24. This recess is specifically bounded by: a downwardly-facing rounded or convex upper surface 34, a downwardly- and leftwardly-facing inclined planar surface 35, a downwardly-facing horizontal surface 36, a rightwardly-facing semi-circular surface 38, an upwardly-facing horizontal surface 39, an upwardly- and leftwardly-facing inclined planar surface 40, and an upwardly-facing rounded or convex surface 41 rejoining second surface 24. Surfaces 34 and 41 tangentially join adjacent surfaces 24,35 and 40,24, respectively. Surfaces 19–22 define an integrally-formed inverted U-shaped lug, indicated at 42, which extends upwardly from a first surface (i.e., coplanar surfaces 18,23) of the lower panel. Surfaces 34–41 define a longitudinal recess which extends into the marginal end portion of the lower panel section from second surface 24, and this recess has an elongated narrowed entrance portion 43 adjacent the second surface 24. This narrowed entrance portion leads into an enlarged cavity portion 44.

Surfaces 26–32 define an integrally-formed upstanding post member, indicated at 45, which extends normally away from lower section third surface 33. This post member is connected to the panel by an integral thin-walled flexible web, indicated at 46. In the preferred embodiment, the post member 45 is initially formed such that surface 32 thereof is inclined with respect to surface 33 at an acute included angle of about 55° (as shown in phantom in FIG. 4), and, after insertion of hinge member 13, is thereafter bent or struck, through compliant plastic deformation of web portion 46, in a counter-clockwise direction (i.e., as seen in FIG. 4) through an angle of about 35° so as to be arranged substantially perpendicular to surface 33 (as shown in solid in FIG. 4), all for purpose hereinafter explained. The lower panel section 11 is preferably extruded of 6063-T52 aluminum alloy or equivalent.

Referring now to FIG. 3, the upper panel section 12 is also shown as being an elongated hollow extruded member, preferably also formed of 6063-T52 aluminum alloy or equivalent, and has a specially-configured lower marginal end portion, also shown in transverse cross-section. This upper panel has inner and outer planar vertical surfaces 48,49, respectively. The lower end face of panel 12 is shown as sequentially including in pertinent part (from left-to-right): a downwardly-facing horizontal surface 50 extending rightwardly from the lower margin of outer vertical surface 49, a rightwardly-facing vertical surface 51, a downwardly-facing horizontal surface 52, a rightwardly-facing vertical surface 53, an upwardly-facing horizontal surface 54, a rightwardly-facing vertical surface 55, a downwardly-facing horizontal surface 56, a leftwardly-facing vertical surface 58, an upwardly-facing horizontal surface 59, a leftwardly-facing vertical surface 60, a downwardly-facing horizontal surface 61, a leftwardly-facing vertical surface 62, a downwardly-facing horizontal surface 63 substantially coplanar with surface 50, a downwardly-facing concave arcuate surface 64, a leftwardly-facing vertical surface 65 tangentially joining surface 64, an upwardly- and leftwardly-facing concave arcuate surface 66, an upwardly- and leftwardly-facing inclined planar surface 68, a leftwardly-facing vertical surface 69, and a downwardly- and rightwardly-facing convex or rounded surface 70 continuing therefrom to tangentially join inner vertical surface 48.

Surfaces 51–62 define an elongated blind recess which extends upwardly into the upper panel from its lower first surface (i.e., surfaces 50,63). Surfaces 52–54 define an integrally-formed lug-like first flange which extends rightwardly into that recess, and surfaces 59–61 define another integrally-formed lug-like second flange 72 which extends leftwardly into the recess so as to be arranged laterally opposite flange 71. Thus, this recess has an enlarged entrance portion 73 (i.e., bounded by surfaces 51,52, 61,62) adjacent surfaces 50,63, a narrowed intermediate throat portion 74 (i.e., defined between opposed flanges 71,72), and an enlarged interior chamber 75 (i.e., defined between surfaces 55,58) arranged between flanges 71,72 and recess bottom surface 56.

The shape and configuration of concave surface 64 is generally known, and is representatively shown and described in the aforesaid U.S. Pat. No. 4,771,816. Similarly, the shape of the depending J-shaped hook portion 76 (i.e., defined between surfaces 65–70 and 48) is also generally known.

Referring now to FIG. 5, hinge member 13 is shown as being a horizontally-elongated extruded solid member having a specially-configured transverse cross-section. This hinge member is sequentially bounded by (from left-to-right): a downwardly-facing horizontal surface 78, a leftwardly-facing vertical surface 79, a downwardly-facing horizontal surface 80, a downwardly- and rightwardly-facing inclined planar surface 81, a downwardly-facing horizontal surface 82, a leftwardly-facing vertical surface 83, an upwardly- and leftwardly-facing inclined planar surface 84, a downwardly- and leftwardly-facing inclined planar surface 85, a leftwardly-facing vertical surface 86 substantially coplanar with surface 83, an upwardly-facing horizontal surface 88, an upwardly- and rightwardly-facing inclined planar surface 89, an upwardly-facing horizontal surface 90, a leftwardly-facing vertical surface 91 substantially coplanar with surface 79, an upwardly-facing horizontal surface 92, an upwardly-facing convex or rounded arcuate surface 93 configured to generally compliment the shape of upper panel section concave surface 64, a rightwardly-facing vertical surface 94 tangentially joining surface 93, an outwardly-facing rounded surface 95 tangentially joining surface 94 and occupying an arc distance of about 260°, a leftwardly-facing vertical surface 96, an inwardly-facing arcuate concave surface 98 occupying an arc distance of about 80°, a rightwardly-facing vertical surface 99 extending tangentially downwardly therefrom, a downwardly-facing horizontal surface 100, a downwardly- and rightwardly-facing inclined planar surface 101, and a rightwardly-facing vertical surface 102 continuing downwardly therefrom to join lowermost surface 78.

Thus, the hinge member has a central body portion 103 (i.e., defined generally between surfaces 79,91,102,99,78 and 92) from which an inverted J-shaped hook portion 104 (i.e., defined between surfaces 93,98,96,94) extends upwardly and rightwardly. The distal end of that hook portion terminates in a rounded bulbosity 105. Surfaces 100–102 are configured to generally compliment the shape of the facing post member surfaces 31,30,29 for purpose hereinafter explained. Moreover, the portion bounded by surfaces 80–90 constitutes an enlarged head portion 106 which is connected to the body portion 103 by a narrowed neck portion 108. This Y-shaped enlarged head portion, which somewhat resembles "split trails" in the preferred embodiment, is adapted to be slidably inserted longitudinally into lower panel cavity 44, with neck portion 108 being arranged in entrance portion 43. The interrupted first surface (i.e., 50,63) of the upper panel section is arranged to engage the first surface (i.e., 18,23) of the lower panel section and the substantially-flush continuing surface 92 thereof provided on the hook member, when the door panels are arranged in vertically-aligned relation to one another (i.e., as shown in FIG. 1). The hinge member is preferably extruded, and formed integrally of 6063-T6 aluminum alloy or equivalent. If desired, the hinge member may be coated with a suitable low-friction material, such as polytetraflouorethylene (i.e., Teflon ®) or the like, to facilitate its longitudinal insertion into the lower panel section and to facilitate the pivotal sliding movement of the upper panel relative to the lower panel.

Referring now to FIG. 6, the seal member is shown as being a specially-configured elongated member having an arrowhead-shaped upper portion 109, a next-lower shank portion 110, a next-lower transversely-enlarged portion 111, and a lower-most downwardly-opening C-shaped portion 112. This seal member is adapted to be deformingly inserted into the recess of the upper panel section, to the position shown in FIGS. 1 and 2, such that the flattened uppermost surface 114 of the seal member is arranged to face recess bottom surface 56, with the arrowhead catch or barb surfaces 115,116 of the arrowhead engaging flange surfaces 54,59, respectively. Once inserted into the position shown in FIGS. 1 and 2, and with the barbs expanded laterally outwardly, the arrowhead-like configuration of the seal member holds the seal member within recess upper chamber 75, and prevents unintended separation therefrom. In this position, the seal member intermediate laterally-thickened portion 111 is operatively positioned between the opposing end surfaces of flanges 71,72 and the elastically-deformable C-shaped portion is arranged in the recess entrance chamber.

As previously set forth, each of the four component parts of the improved combination are shown in transverse cross-section in the several drawing figures, and persons skilled in this art will readily appreciate that each of these members is elongated along respective axes extending out of the paper.

Thus, to assemble the device, the seal member 14 is inserted into the upper panel seal-receiving recess, with the deformable arrowhead-shaped upper portion of the seal member passing through the recess narrowed throat portion 74 until the barbs of the upper portion expand outwardly in recess chamber 75. Once so inserted, the seal member is held against unintended separation from the recess. Thereafter, hinge member 13 may be longitudinally and slidably inserted into engagement with the lower panel section. As shown in FIGS. 1 and 2, the enlarged head portion 106 is received in lower panel enlarged cavity 44, and the narrowed seal member neck portion 108 is arranged in the narrowed cavity entrance portion 41, with the hinge member second surface (i.e., surfaces 91,79) engaging the lower panel second surface (i.e., surfaces 24,24). If the lower section was initially formed such that post member surface 32 is inclined with respect surface 33 by an acute included angle of about 55°, shown in phantom in FIG. 4, the post member may thereafter be bent or struck upwardly, by compliant plastic deformation of the web portion 46, such that post member surface 32 will thereafter be substantially perpendicular to surface 33. This initial inclination of surface 32 relative to surface 33 facilitates longitudinal sliding insertion of the hinge member into its operative engagement with the lower panel section. Once so positioned, the post member is then struck to the alternative position, shown in solid in FIG. 4, to securely hold the hinge member to the lower panel section.

Thereafter, the lower panel-and-hinge subassembly may be operatively connected to the upper panel-seal subassembly by articulating the two panels such that the J-shaped hook portion of the hinge member is positioned within the cooperative cavity provided in the upper panel section, all as shown in FIGS. 1 and 2. In this assembled configuration, the two panel sections remain pivotally coupled to one another as the door articulates the track (not shown) on which the door is mounted.

When the panels are in vertically-aligned relation, as shown in FIG. 1, the lower panel lug 42 is positioned within the entrance portion 73 of the upper panel recess, and compressibly engages the lower C-shaped portion of the seal member. The lower portion of the seal member is deliberately provided to have a pincer-like shape or configuration in order that the lower portion thereof may be more readily flexible than the upper and intermediate portions thereof. The engagement of this lug with the seal member provides a substantially weather-tight sealed joint between the vertically-aligned panel sections. At the same time, the seal member is protectively recessed within the upper panel.

When the door is moved upwardly and articulates the curved section of the track (not shown), the upper panel section may move pivotally relative to the lower panel section, as depicted in FIG. 2. This figure shows the upper panel section as having been moved clockwise through an angle of about 30° relative to the still-vertical lower panel section. Here, it should be noted that by virtue of the pivotal connection between the adjacent panels, and the eccentric position of the seal and lug, lower panel lug 42 has now moved temporarily out of upper panel section recess entrance portion 73, thereby allowing the C-shaped portion of the seal member to expand back to its original undeformed shape. However, when the two panel sections are aligned, either vertically or horizontally, lug 42 will normally be inserted into entrance portion 73. At the same time, the rollers (not shown) which extend outwardly from the left and right marginal end faces of the door, will be confined within the track, and will prevent the door from moving to a position at which the connected panels may inadvertently separate from one another.

Accordingly, the invention provides an improved joint construction for a roll-up door or the like, which is low in cost when manufactured in quantity, which affords the capability of providing substantially planar inner and outer surfaces (i.e., without headed fasteners extending into the cargo-carrying compartment), which is strong and sturdy, which is easily assemblable, which may be readily cut to different lengths to suit different door sizes, and which provides a protectively-concealed weather-tight seal when the door is in its operative vertical position.

MODIFICATIONS

The present invention contemplates that many changes and modifications may be made. For example, while the upper and lower panel sections have been disclosed as being preferably formed of 6063-T52 aluminum alloy, it is manifest that such door panels may be formed of other materials as well. Similarly, while these two panel sections have been disclosed as having been extruded, persons skilled in this art will appreciate that the various operative portions thereof may be formed as subassemblies, and subsequently assembled together, if desired. Similarly, while the hinge member is preferably formed of 6063-T6 aluminum alloy, and subsequently coated with a low-friction material, such as polytetraflouroethylene (i.e., Teflon ®), it should also be apparent that this hinge member may be formed of other materials and/or coated with other friction-reducing materials as well. Indeed, if desired, the entire hinge member may be formed of such Teflon ® material, as desired. The provision of such anti-friction coating on the hinge member facilitates its longitudinal insertion into the recess in the lower panel section, and also reduces frictional sliding movement as the door articulates the L-shaped track. The seal member may be formed of a low-temperature soft flexible vinyl, or some other suitable material.

The invention also contemplates that many changes may be made in the configurations of the various parts. For example, the particular shape and configuration of cavity 44 in the lower panel section is exemplary only. Thus, the particular cross-sectional shape of cavity 44, as well as the complimentary shape of hinge member enlarged head portion 106, is largely a matter of design choice, and may be readily changed or varied. Similarly, it is not invariably necessary that the post member be bent upwardly from an initially-inclined position relative to surface 33. If desired, the post member could easily be formed initially in such upright position, although this might impede free slidable insertion of the hinge member into the lower panel section. While the seal member is shown as having an arrowhead-like upper portion to provide two separate catch surfaces for engagement with the upper panel section recess flanges, this operative connection between the seal member and upper panel section may be varied as desired.

Therefore, while the presently preferred embodiment of the improved joint construction has been shown and described, and several modifications thereof discussed, persons skilled in this art will readily appreciate that various additional changes and modifications may be made without departing from the spirit of the invention, as defined and differentiated by the following claims.

I claim:

1. In an elongated first panel section for an upwardly-acting door, said first panel section having spaced parallel planar inner and outer surfaces, the improvement which comprises:

one longitudinal marginal end portion of said first panel section having a generally-stepped configuration including a first surface extending away from one of said planar surfaces, having an intermediate second surface extending away from said first surface, and having a third surface extending away from said second surface to join the other of said planar surfaces;

a recess extending into said first panel section from said second surface, said recess including an enlarged cavity portion within said first panel section and a narrowed entrance portion extending into said first panel section from said second surface and communicating with said enlarged cavity portion; and a post member extending away from said third surface in spaced relation to said second surface, said post member being connected to said third surface by a flexible web portion, said post member being initially formed to lie at one angle with respect to said third surface and being bent through compliant plastic deformation of said web portion so as to be arranged at another angle with respect to said third surface.

2. The improvement as set forth in claim 1 wherein each of said first and third surfaces is substantially perpendicular to said inner and outer surfaces.

3. The improvement as set forth in claim 1 wherein said second surface is substantially parallel to said inner and outer surfaces.

4. The improvement as set forth in claim 1 wherein said post member extends upwardly from said third surface.

5. The improvement as set forth in claim 1 and further comprising an elongated lug extending upwardly from said first surface.

6. The improvement as set forth in claim 5 and further comprising: an adjacent panel section provided with an elongated recess, and wherein said lug is adapted to be received in said adjacent panel recess, a seal member positioned within said adjacent panel recess, and wherein said lug has an upper surface arranged to compressively engage said seal member when said panels are arranged in vertically-aligned relation to one another.

7. The improvement as set forth in claim 1 wherein said second surface joins said first surface.

8. The improvement as set forth in claim 1 wherein said third surface joins said second surface.

9. The improvement as set forth in claim 1 and further comprising:

a hinge member operatively engaged with said first panel section, said hinge member having a central body portion bounded by a first surface arranged to be substantially flush with said first panel section first surface, having a second surface arranged to engage said first panel section second surface, having a hook portion extending away from said body portion in spaced relation to said third surface, having another surface engaging said post member, having an enlarged head portion arranged in said first panel section cavity portion, and having a narrowed neck portion arranged within said first panel section narrowed entrance portion.

10. The improvement as set forth in claim 9 wherein said hinge member other surface is configured to cooperatively compliment the shape of said post member.

11. The improvement as set forth in claim 9, and further comprising:

a second panel section pivotally connected to said first panel section, said first panel section having a longitudinally-extending lug extending beyond said first surface, said second panel section having a longitudinally-extending recess, said second panel having a first surface arranged to engage said first panel first surface when said panels are arranged in vertically-aligned relation, and having a longitudinally-extending cavity arranged to receive said hinge member hook portion.

12. The improvement as set forth in claim 11, and further comprising:

a resilient seal member operatively arranged in said second panel recess, and arranged to be compressed by said lug when said first and second panels are in said vertically-aligned relation.

13. The improvement as set forth in claim 9 wherein said hinge member is coated with an anti-friction material.

14. In an elongated first panel section for an upwardly-acting door, said first panel section having spaced parallel planar inner and outer surfaces, the improvement which comprises:

one longitudinal marginal end portion of said first panel section having a generally-stepped configuration including a first surface extending away from one of said planar surfaces, having an intermediate second surface extending away from said first surface, and having a third surface extending away from said second surface to join the other of said planar surfaces;

a recess extending into said first panel section from said second surface, said recess including an enlarged cavity portion within said first panel section and a narrowed entrance portion extending into said first panel section from said second surface and communicating with said enlarged cavity portion;

a post member extending away from said third surface in spaced relation to said second surface;

an elongated lug extending upwardly from said first surface;

an adjacent panel section provided with an elongated recess arranged to face said first panel marginal end portion when said panels are vertically disposed, said first panel section lug being adapted to be received in said adjacent panel recess when said panels are vertically disposed; and a seal member positioned within said adjacent panel recess, said first panel section lug having an upper surface arranged to compressively engage said seal member when said panels are vertically disposed.

15. The improvement as set forth in claim 14 wherein a flange portion extends into said adjacent panel recess to form a narrowed throat portion therein.

16. The improvement as set forth in claim 15 wherein said seal member has a hook portion adapted to deformingly pass through said narrowed throat portion, and has a catch surface arranged to engage said flange portion to prevent unintended separation of said seal member from said adjacent panel recess.

17. The improvement as set forth in claim 16 wherein two opposed flange portions extend into said recess to form said narrowed throat portion, and wherein said seal member has two opposed catch surfaces adapted to engage said flange portions to prevent unintended separation of said seal member from said adjacent panel recess.

18. The improvement as set forth in claim 17 wherein said hook portion of said seal member is configured as an arrowhead.

19. In an elongated first panel section for an upwardly-acting door, said first panel section having spaced parallel planar inner and outer surfaces, the improvement which comprises:

one longitudinal marginal end portion of said first panel section having a generally-stepped configuration including a first surface extending away from one of said planar surfaces, having an intermediate second surface extending away from said first surface, and having a third surface extending away from said second surface to join the other of said planar surfaces;

a recess extending into said first panel section from said second surface, said recess including an enlarged cavity portion within said first panel section and a narrowed entrance portion extending into said first panel section from said second surface and communicating with said enlarged cavity portion;

a post member extending away from said third surface in spaced relation to said second surface; and a hinge member operatively engaged with said first panel section, said hinge member having a central body portion bounded by a first surface arranged to be substantially flush with said first panel section first surface, having a second surface arranged to engage said first panel section second surface, having a hook portion extending away from said body portion in spaced relation to said third surface, having another surface engaging said post member, having an enlarged head portion arranged in said first panel section cavity portion, and having a narrowed neck portion arranged within said first panel section narrowed entrance portion.

* * * * *